(12) United States Patent
Check et al.

(10) Patent No.: US 9,908,485 B2
(45) Date of Patent: Mar. 6, 2018

(54) ACOUSTIC BARRIER ASSEMBLY WITH ACOUSTIC SEAL

(71) Applicant: Cadillac Products Automotive Company, Troy, MI (US)

(72) Inventors: James Check, Armada, MI (US); Kenneth Ritzema, Clarkston, MI (US); Michael Demo, Macomb, MI (US)

(73) Assignee: Cadillac Products Automotive Company, Troy, MI (US)

( * ) Notice: Subject to any disclaimer, the term of this patent is extended or adjusted under 35 U.S.C. 154(b) by 0 days.

(21) Appl. No.: 14/933,174

(22) Filed: Nov. 5, 2015

(65) Prior Publication Data

US 2016/0129855 A1     May 12, 2016

Related U.S. Application Data

(60) Provisional application No. 62/075,942, filed on Nov. 6, 2014.

(51) Int. Cl.
*B60R 13/08* (2006.01)
*B32B 3/26* (2006.01)
(Continued)

(52) U.S. Cl.
CPC ............ *B60R 13/083* (2013.01); *B32B 3/266* (2013.01); *B60R 13/0846* (2013.01);
(Continued)

(58) Field of Classification Search
CPC .............. B60R 13/083; B60R 13/0815; B60R 13/0846; B60R 13/0884; B32B 3/266;
(Continued)

(56) References Cited

U.S. PATENT DOCUMENTS 4,083,595 A * 4/1978 Maier ................. B60R 13/0846
181/290
4,655,496 A * 4/1987 Gahlau ................. B60R 13/083
181/204

(Continued)

FOREIGN PATENT DOCUMENTS

FR       2745034 A1 * 8/1997 ......... B29C 44/1271
FR       2913805 A1 * 9/2008 ........... G10K 11/168

*Primary Examiner* — Edgardo San Martin
(74) *Attorney, Agent, or Firm* — Harness, Dickey & Pierce, P.L.C.

(57) ABSTRACT

An acoustic barrier assembly for a vehicle and a method of manufacturing the same is disclosed. A decoupler layer surrounds a pass-through opening in a wall of the vehicle to defining a decoupler aperture that is open to the pass-through opening. A barrier layer abuts the decoupler layer and defines a barrier aperture that is also open to the pass-through opening. An acoustic seal is integrally formed in the barrier layer. The acoustic seal defines an exposed region of the barrier layer that is not bounded by the decoupler layer. The exposed region of the barrier layer directly contacts the wall around the pass-through opening and seals around a penetrating member that extends through the pass-through opening. The acoustic seal thus reduces flanking noise traveling through a gap between the penetrating member and the pass-through opening.

21 Claims, 11 Drawing Sheets

(51) Int. Cl.
*B60R 13/00* (2006.01)
*B32B 3/00* (2006.01)
*B29K 23/00* (2006.01)
*B29K 27/06* (2006.01)
*B29K 105/00* (2006.01)

(52) U.S. Cl.
CPC ...... *B29K 2023/06* (2013.01); *B29K 2023/12* (2013.01); *B29K 2027/06* (2013.01); *B29K 2105/0002* (2013.01); *B29K 2995/0002* (2013.01)

(58) Field of Classification Search
CPC ......... B32B 3/26; G10K 11/168; F02B 77/13; F02B 77/11
USPC ................ 181/290, 204, 205; 296/39.1, 39.3
See application file for complete search history.

(56) References Cited

U.S. PATENT DOCUMENTS

| | | | | |
|---|---|---|---|---|
| 4,715,473 A * | 12/1987 | Tschudin-Mahrer | ..... | B32B 5/18 181/286 |
| 4,719,892 A * | 1/1988 | Lopez-Crevillen | ..... | F02B 77/13 123/195 C |
| 5,557,078 A * | 9/1996 | Holwerda | ........... | B60R 13/0846 181/208 |
| 5,601,899 A * | 2/1997 | Campbell | ........... | B60R 13/0206 24/297 |
| 5,824,974 A * | 10/1998 | Campbell | ............... | B60R 13/08 181/290 |
| 5,854,452 A * | 12/1998 | Campbell | ............... | B60R 13/08 181/286 |
| 5,975,609 A * | 11/1999 | Campbell | ............. | B60R 13/083 181/284 |
| 6,070,928 A * | 6/2000 | Campbell | ........... | B60R 13/0275 174/152 G |
| 6,089,349 A * | 7/2000 | Aye | ..................... | B29C 45/4407 181/284 |
| 6,695,374 B1 * | 2/2004 | Gebreselassie | ....... | B60R 13/083 180/90 |
| 6,808,045 B2 * | 10/2004 | Campbell | ............. | B60R 13/083 181/204 |
| 6,951,263 B2 * | 10/2005 | Blomeling | ............ | B29C 43/203 181/204 |
| 6,974,172 B2 * | 12/2005 | Gebreselassie | ....... | B60R 13/083 180/90 |
| 6,981,737 B2 * | 1/2006 | Welsh | ................ | B60H 1/00571 296/187.02 |
| 7,017,250 B2 * | 3/2006 | Gebreselassie | ....... | B60R 13/083 29/29 |
| 7,080,712 B2 * | 7/2006 | Tsuiki | ................... | B60R 13/083 181/204 |
| 7,909,134 B2 * | 3/2011 | Krus | ....................... | B32B 3/266 181/210 |
| 7,971,683 B2 * | 7/2011 | Bayle | ...................... | B60R 13/02 181/204 |
| 7,980,358 B2 * | 7/2011 | Soltau | ................... | B60R 13/083 181/204 |
| 8,276,710 B2 * | 10/2012 | Soltau | ................ | B29C 44/0407 181/284 |
| 8,403,390 B2 * | 3/2013 | Rich | ..................... | B62D 65/14 219/117.1 |
| 8,888,174 B2 * | 11/2014 | Roggenkamp | ...... | F02M 35/1294 296/208 |
| 2005/0046217 A1* | 3/2005 | Campbell | ........... | B60R 13/0846 296/39.3 |
| 2005/0046218 A1* | 3/2005 | Campbell | ........... | B60R 13/0846 296/39.3 |
| 2011/0127730 A1* | 6/2011 | Seryi | .................. | B60H 1/00571 277/606 |
| 2015/0232044 A1* | 8/2015 | Demo | .................... | B60R 13/08 181/290 |
| 2016/0307555 A1* | 10/2016 | Demo | .................... | B05D 1/02 |

\* cited by examiner

ACOUSTIC BARRIER ASSEMBLY WITH ACOUSTIC SEAL

CROSS-REFERENCE TO RELATED APPLICATIONS

This application claims the benefit of U.S. Provisional Application No. 62/075,942, filed on Nov. 6, 2014. The entire disclosure of the above application is incorporated herein by reference.

FIELD

The present disclosure relates to acoustic barrier assembly and a method of manufacturing the same. Such acoustic barrier assemblies may be used in a variety of different applications, including without limitation, automobile vehicles such as light passenger vehicles and light duty trucks.

BACKGROUND

This section provides background information related to the present disclosure which is not necessarily prior art.

Vehicle manufacturers often install multi-layer noise insulation mats in automobiles to quiet the passenger compartment of the vehicle. Such multi-layer noise insulation mats, also referred to as noise attenuation systems, are typically made of foam and/or "shoddy" material built up for lightweight constructions. Thicknesses of these multi-layer noise insulation mats typically range from 0.25 inches to multiple inches.

One such noise insulation mat is disclosed by Gahlau et al. in U.S. Pat. No. 4,655,496 entitled "Motor Vehicle Noise Insulation." As shown in this reference, such noise insulation mats are often applied in a blanket form to cover surface areas of the vehicle such as the engine firewall and transmission tunnel) to attenuate engine noise and road noise entering the passenger compartment of the vehicle. Typical noise insulation mats require apertures since the surfaces of the vehicle include pass-through openings that accommodate various penetrating members, such as a steering column, electrical wiring, and ducting. These pass-through openings create problems with flanking noise that travels through the pass-through openings and into the passenger compartment thereby reducing the effectiveness of the noise insulation mat for any given thickness.

When fuel economy concerns were not as stringent as they are today and when higher horsepower engines were used, the noise insulation mats could be thicker, increasing both their weight and thereby their noise attenuation capability, without significant impact on vehicle performance. As vehicle fuel economy becomes an increasing priority, horsepower ratings must decrease and noise attenuation system weight allowances have decreased. This has forced noise attenuation system manufacturers to use lighter weight materials. Noise attenuation system weight has subsequently decreased, but at a tradeoff with the acoustic attenuation achieved. It has therefore become desirable to provide noise attenuation systems that provide attenuation levels similar to the prior thicker/heavier designs while providing the benefits of reduced weight.

SUMMARY

This section provides a general summary of the disclosure and is not a comprehensive disclosure of its full scope or all of its features.

According to several aspects of the present disclosure, an acoustic barrier assembly is described. The acoustic barrier assembly generally includes a decoupler layer and a barrier layer. The decoupler layer extends between an outer decoupler perimeter and an inner decoupler perimeter. Accordingly, the inner decoupler perimeter defines a decoupler aperture in the decoupler layer. The barrier layer abuts the decoupler layer and extends between an outer barrier perimeter and an inner barrier perimeter. The inner barrier perimeter defines a barrier aperture in the barrier layer that is open to the decoupler aperture. The acoustic barrier assembly also includes an acoustic seal integrally formed in the barrier layer. The acoustic seal defines an exposed region of the barrier layer that is not bounded by the decoupler layer. This exposed region of the barrier layer extends from the inner decoupler perimeter to the inner barrier perimeter. Accordingly, the exposed region of the barrier layer at the acoustic seal is provided to seal around a penetrating member that extends through the decoupler aperture and the barrier aperture. Advantageously, the acoustic seal blocks flanking noise from traveling through the acoustic barrier assembly adjacent the penetrating member.

According to several other aspects of the present disclosure, a method of manufacturing an acoustic barrier assembly is described. The method includes the steps of forming a decoupler layer sheet from a sound absorbent material and forming at least one decoupler aperture in the decoupler layer sheet. In accordance with this method step, the at least one decoupler aperture defines an inner decoupler perimeter that is formed about the at least one decoupler aperture. The method also includes the steps of forming a barrier layer sheet from a material having a material weight ranging from approximately 0.1 pounds per square foot (psf) to approximately 0.7 pounds per square foot (psf) and molding at least one integral acoustic seal in the barrier layer sheet by a deep draw molding process during the step of forming the barrier layer sheet. In accordance with this method step, the at least one integral acoustic seal is made entirely of the material forming the barrier layer sheet and defines at least one barrier aperture therein. Further, the barrier layer sheet is formed such that it has an inner barrier perimeter that is defined by the at least one barrier aperture, where the inner barrier perimeter is smaller than the inner decoupler perimeter. The method further includes the steps of joining the decoupler layer sheet to the barrier layer sheet to form a multi-layered sheet after the step of molding the at least one integral acoustic seal in the barrier layer sheet and cutting at least one final acoustic barrier assembly from the multi-layered sheet after the step of joining the decoupler layer sheet to the barrier layer sheet.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION

Referring to the Figures, wherein like numerals indicate corresponding parts throughout the several views, an acoustic barrier assembly 20 is disclosed. Such acoustic barrier assemblies 20 may find utility in a wide range of application. By way of example and without limitation, the disclosed acoustic barrier assembly 20 may be utilized in automotive vehicles such as passenger vehicles and light duty trucks. Specifically, the acoustic barrier assembly 20 may be used in these automotive applications to reduce sound levels within or outside the vehicle.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
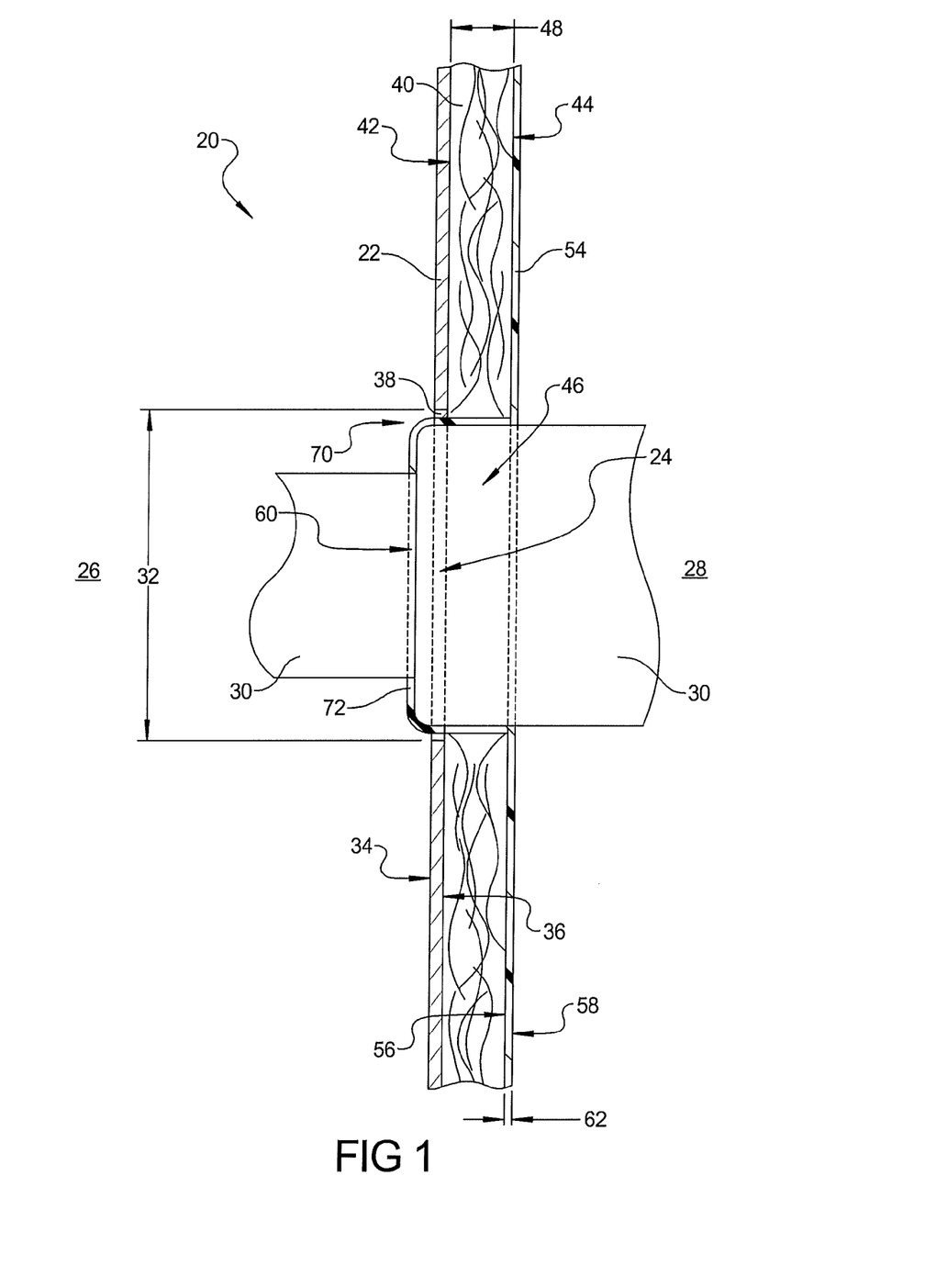
FIG. 1 is a side cross-sectional view of an exemplary acoustic barrier assembly constructed in accordance with the present disclosure that is shown installed on a wall having a pass-through opening.

With reference to FIG. 1, the disclosed acoustic barrier assembly 20 may be installed on a wall 22 defining a pass-through opening 24. In the example where the acoustic barrier assembly 20 is configured for use in a vehicle, the wall 22 may be for example a firewall separating an engine compartment 26 of the vehicle and a passenger compartment 28 of the vehicle. In this example and without limitation, the wall 22 is made of sheet metal and the pass-through opening 24 receives a penetrating member 30, which may be one or more electrical components, mechanical components, and the like. For example and without limitation, the penetrating member 30 may be a steering column or brake pedal and accelerator pedal linkages. Of course the wall 22 may be elsewhere on the vehicle such as along a transmission tunnel or body panel or may be any wall adjacent a noise source, which may be, without limitation, an engine. It should also be appreciated that the wall 22 can have any geometric form including planar, curved, rough, wavy, and the like, or can also have a free form.

The pass-through opening 24 extends entirely through the wall 22 and has an opening perimeter 32. Thus, it should be appreciated that the pass-through opening 24 may or may not be circular, as other shapes are envisioned and are considered within the scope of the present disclosure. The wall 22 also presents a first wall surface 34 facing the noise source and a second wall surface 36 that is opposite the first wall surface 34. Accordingly, the first wall surface 34 and the second wall surface 36 are oppositely arranged along the same wall 22. In the exemplary configuration shown in FIG. 1, the first wall surface 34 faces the engine compartment 26 of the vehicle and the second wall surface 36 faces a passenger compartment 28 of the vehicle. The penetrating member 30 extends through the pass-through opening 24 in the wall 22 to define a gap 38 between the penetrating member 30 and the opening perimeter 32. This gap 38 is often necessary to enable and/or expedite assembly or to provide sufficient clearance for the penetrating member 30. However, the gap 38 also provides a flanking noise path through which noise may pass through the wall 22. In the case where the wall 22 is part of a vehicle, this flanking noise contributes to a passenger compartment 28 that has excess engine noise, road noise, and/or wind noise.

The acoustic barrier assembly 20 of the present disclosure advantageously reduces or eliminates noise transmission through the wall 22 and the pass-through opening 24. Still referring now to FIGS. 1-4, the acoustic barrier assembly 20 includes a decoupler layer 40 having a first decoupler surface 42 that abuts the second wall surface 36 and a second decoupler surface 44 that is opposite the first decoupler surface 42. The decoupler layer 40 generally surrounds the pass-through opening 24 in the wall 22 and defines a decoupler aperture 46 that is open to the pass-through opening 24 in the wall 22. The decoupler layer 40 extends between the first decoupler surface 42 and the second decoupler surface 44 in a transverse direction to define a decoupler thickness 48 and between an outer decoupler perimeter 50 and an inner decoupler perimeter 52 in a longitudinal direction that is generally parallel with the first decoupler surface 42 and the second decoupler surface 44. By way of example and without limitation, the decoupler thickness 48 can range from approximately 5 millimeters (mm) to approximately 30 millimeters (mm), and can vary over the extent of the decoupler layer 40 to accommodate compression due to local space restrictions, such as ventilation system ducting, electrical cableways, and the like. Notwithstanding, the decoupler layer 40 need not be flat or of uniform thickness and the first decoupler surface 42 may or may not be parallel to the second decoupler surface 44.

The inner decoupler perimeter 52 is formed about the decoupler aperture 46 such that the inner decoupler perimeter 52 may circumscribe the pass-through opening 24 in the wall 22. Like the pass-through opening 24, the decoupler aperture 46 may or may not be circular, as other shapes are envisioned and are within the scope of the present disclosure. It should also be appreciated that the decoupler layer 40 may advantageously be made of a sound absorbent material. By way of example and without limitation, the sound absorbent material forming the decoupler layer 40 may be any moldable fiber or foam including polyester fiber and cotton, and/or a combination of these materials. The sound absorbent material of the decoupler layer 40 is selected and intended to take on and mimic the shape of wall 22 and retain this shape.

The acoustic barrier assembly 20 also includes a barrier layer 54 having a first barrier surface 56 that abuts the second decoupler surface 44 and a second barrier surface 58 that is opposite the first barrier surface 56. Accordingly, the decoupler layer 40 acts as an air-gap between the wall 22 and the barrier layer 54 such that sound is not transmitted from the wall 22 to the barrier layer 54. The barrier layer 54 defines a barrier aperture 60 that is open to the pass-through opening 24 in the wall 22. The barrier layer 54 extends between the first barrier surface 56 and the second barrier surface 58 in the transverse direction to define a barrier thickness 62 and between an outer barrier perimeter 64 and an inner barrier perimeter 66 in the longitudinal direction. By way of example and without limitation, the barrier thickness 62 may range from approximately 0.5 millimeters (mm) to approximately 1.5 millimeters (mm). Notwithstanding, the barrier layer 54 need not be flat or of uniform thickness and the first barrier surface 56 may or may not be parallel to the second barrier surface 58.

Figure 4:
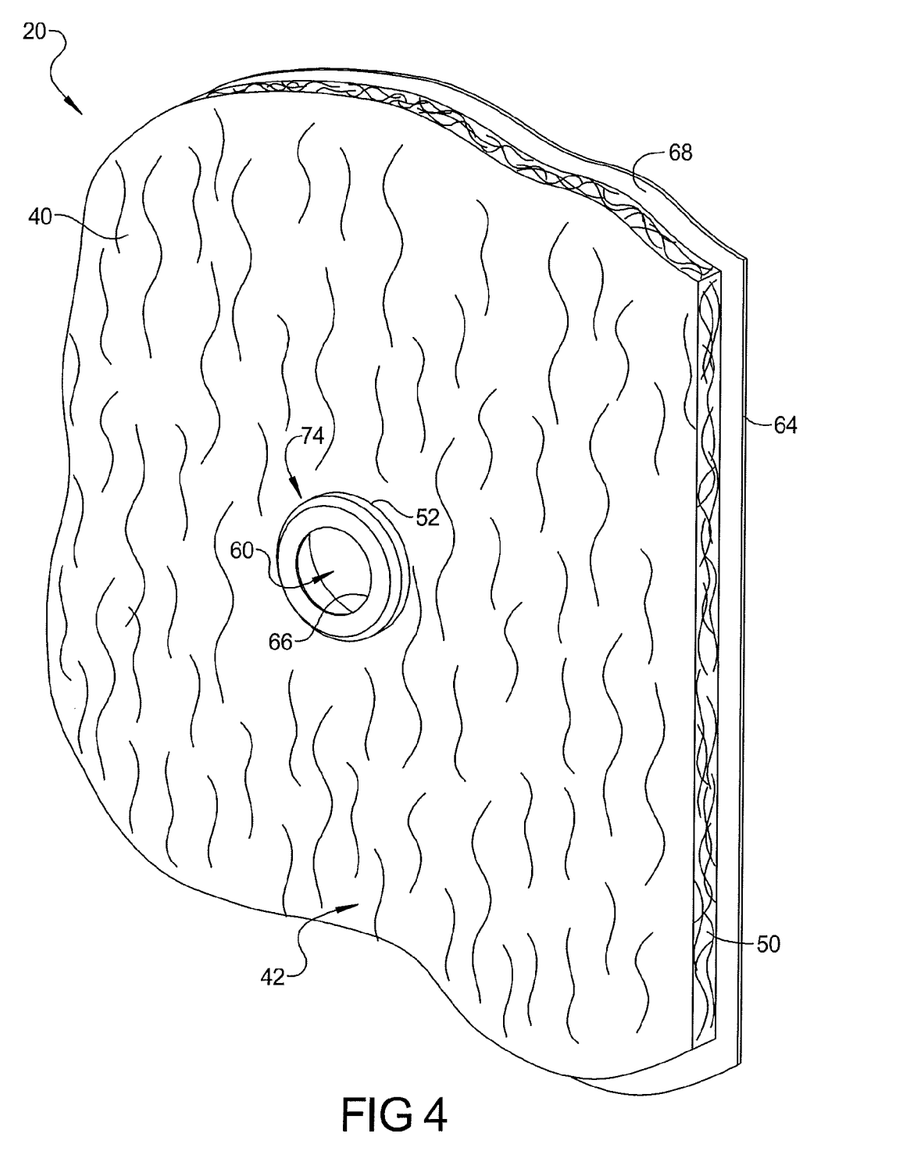
FIG. 4 is a rear perspective view of the exemplary acoustic barrier assembly illustrated in FIG. 1.

As best seen in FIG. 4, the outer barrier perimeter 64 may be larger than the outer decoupler perimeter 50 such that there is a peripheral flap 68 formed by the barrier layer 54 that extends outwardly from the outer decoupler perimeter 50. The inner barrier perimeter 66 is formed about the barrier aperture 60 and is smaller than the inner decoupler perimeter 52. Accordingly, the barrier aperture 60 is smaller in size than the decoupler aperture 46. The barrier layer 54 is made of a sound reflecting material meaning that the barrier layer 54 re-directs sound waves that are incident on the barrier layer 54. By contrast, the sound absorbent material of the decoupler layer 40 absorbs and/or attenuates sound waves that are incident on the decoupler layer 40. The barrier layer 54 may also be defined by material weight. For example, the barrier layer 54 may have a material weight ranging from approximately 0.050 pounds per square foot (psf) to approximately 0.7 pounds per square foot (psf). By way of example and without limitation, the sound reflecting material forming the barrier layer 54 may be polypropylene (PP), polyvinylchloride (PVC), polyethylene (PE), ethylene vinyl acetate (EVA), any other thermoplastic or thermoset materials, and/or a combination of these materials.

Referring to FIGS. 1-5, an acoustic seal 70 is integrally formed in the barrier layer 54. Accordingly, the acoustic seal 70 is integrally molded as part of the barrier layer 54 and is made entirely of the sound reflecting material forming the barrier layer 54. Thus it should be appreciated that the acoustic seal 70 is a portion of the boundary layer 54 that is configured to block flanking noise traveling through the pass-through opening 24. As explained below, the acoustic seal 70 may include several features such the acoustic seal 70 comprises the overall structure of these combine features. The acoustic seal 70 defines an exposed region 72 of the barrier layer 54 that is not bounded by the decoupler layer 40 and that extends from the inner decoupler perimeter 52 to the inner barrier perimeter 66. The inner barrier perimeter 66 may or may not be smaller than the opening perimeter 32 such that the gap 38 between the penetrating member 30 and the opening perimeter 32 is covered by the acoustic seal 70. The exposed region 72 of the barrier layer 54 may include a mating portion 80 that extends along the second wall surface 36. It should thus be appreciated that the mating portion 80 of the exposed region 72 of the barrier layer 54 extends in a direction that is parallel to the second wall surface 36. This however does not mean that the mating portion 80 must be planar, as the mating portion 80 may follow a contour of the second wall surface 36 where the second wall surface 36 is not planar. Accordingly, the mating portion 80 is flush to the second wall surface 36 and directly contacts the second wall surface 36 around the pass-through opening 24 in the wall 22. In this way, the acoustic seal 70 and seals around the penetrating member 30 to reduce flanking noise traveling through the gap 38 between the penetrating member 30 and the opening perimeter 32 of the pass-through opening 24 in the wall 22. It should also be appreciated that the acoustic seal 70 is not necessarily air or water tight and the acoustic seal 70 does not necessarily block noise transmission one hundred percent. The acoustic seal 70 reduces flanking noise by creating a tortuous path for the flanking noise traveling through the gap 38 between the penetrating member 30 and the opening perimeter 32 of the pass-through opening 24 in the wall 22.

Figure 2:
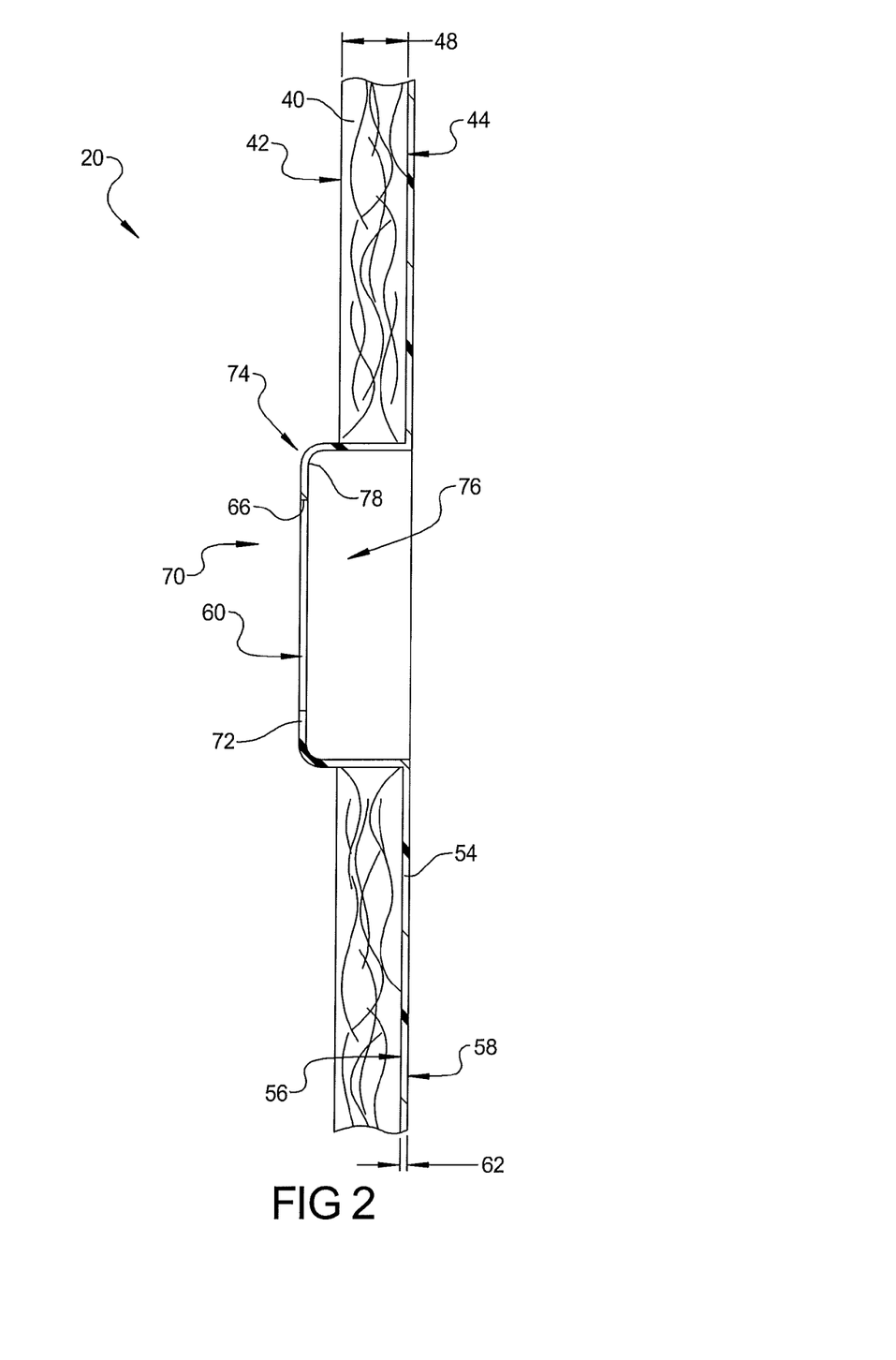
FIG. 2 is another side cross-sectional view of the exemplary acoustic barrier assembly illustrated in FIG. 1.
Figure 3:
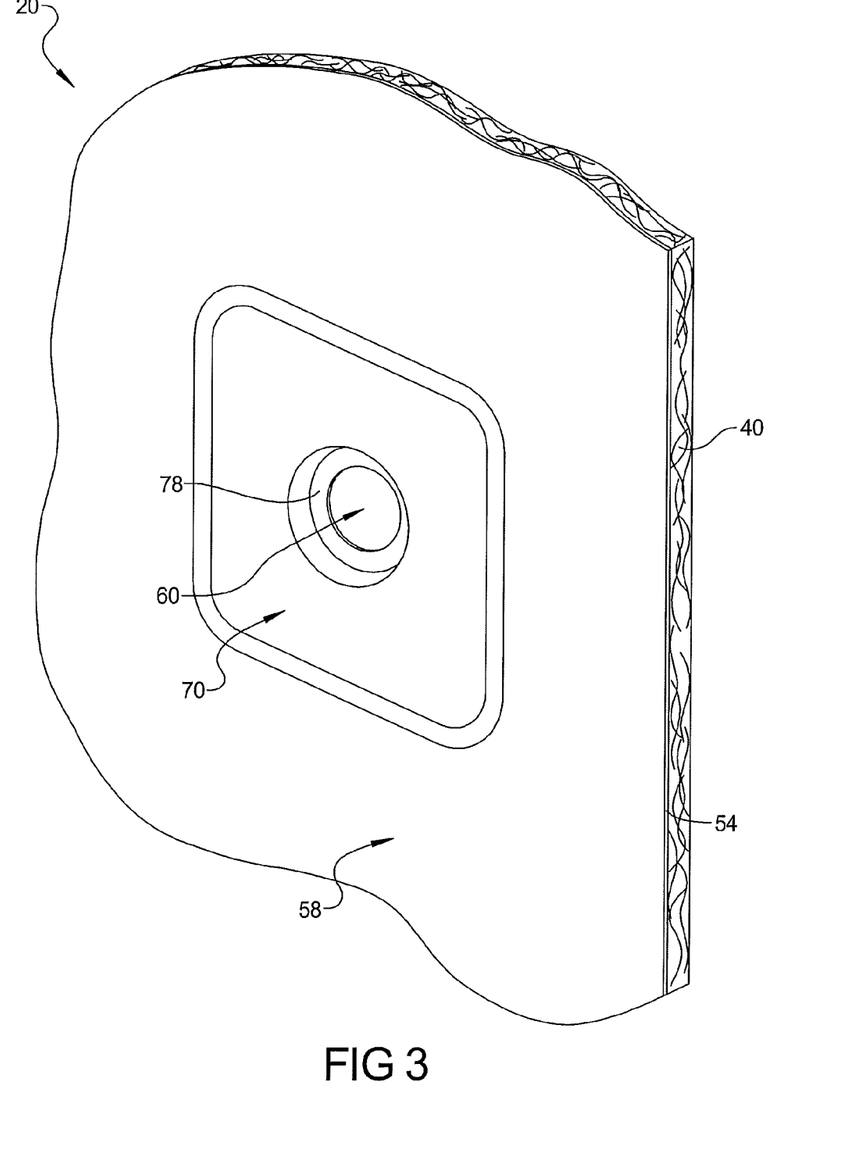
FIG. 3 is a front perspective view of the exemplary acoustic barrier assembly illustrated in FIG. 1.

As best seen in FIGS. 1, 2, and 4, the acoustic seal 70 may include a deep-drawn projection 74 that extends past the second decoupler surface 44 and toward the first decoupler surface 42 to mate with the pass-through opening 24 in the wall 22. Accordingly, the deep-drawn projection 74 of the acoustic seal 70 extends through the decoupler layer 40. The deep drawn projection 74 of the acoustic seal 70 defines an inner bore 76 therein. The deep-drawn projection 74 may further include an inner shoulder 78 that extends inwardly from the inner bore 76 to the inner barrier perimeter 66 and thus defines the barrier aperture 60. Accordingly, the inner shoulder 78 of the deep-drawn projection may or may not contact at least one of the penetrating member 30 and the wall 22.

Figure 5:
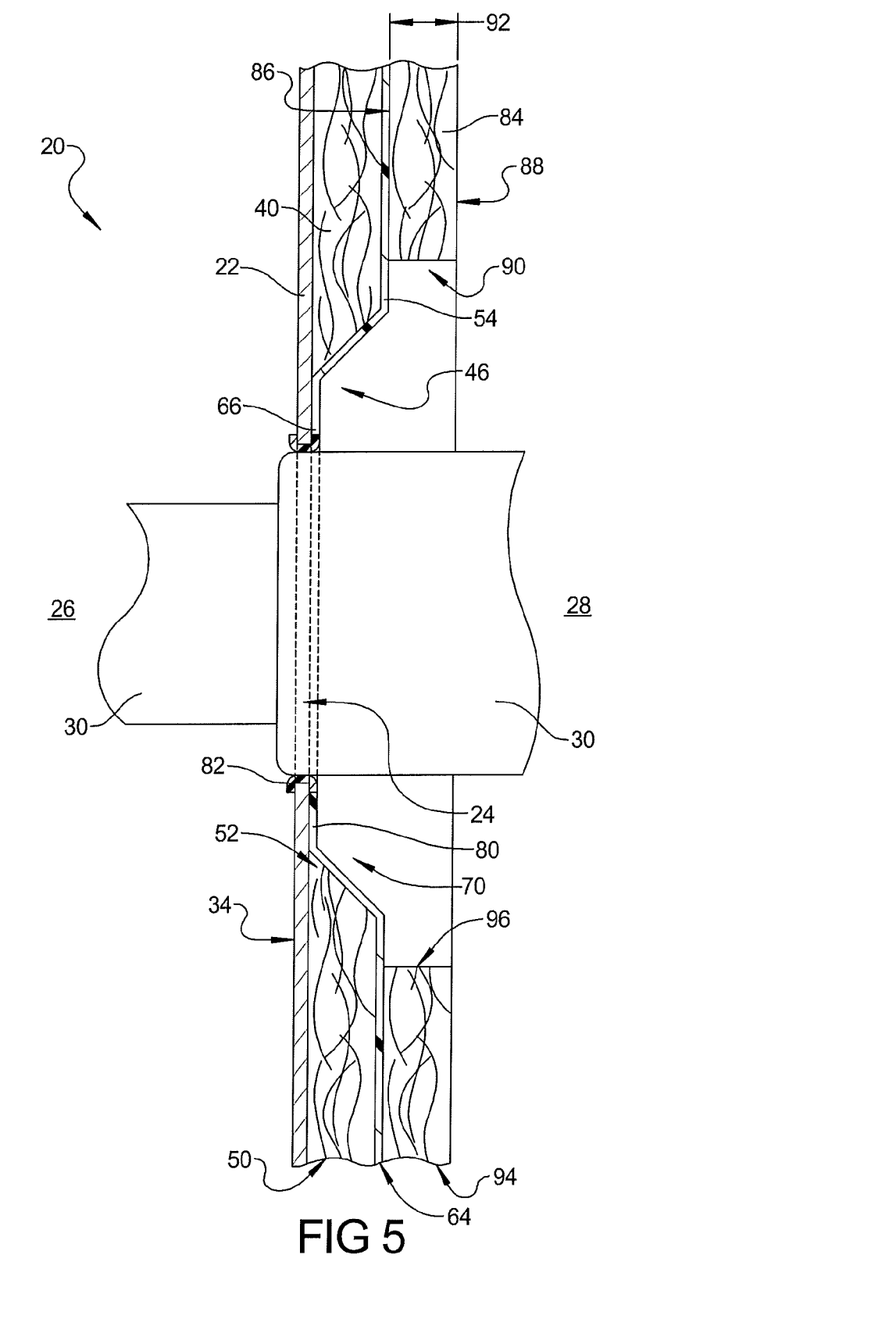
FIG. 5 is a side cross-sectional view of another exemplary acoustic barrier assembly constructed in accordance with the present disclosure that is shown installed on a wall having a pass-through opening surrounded by a grommet.
Figure 6:
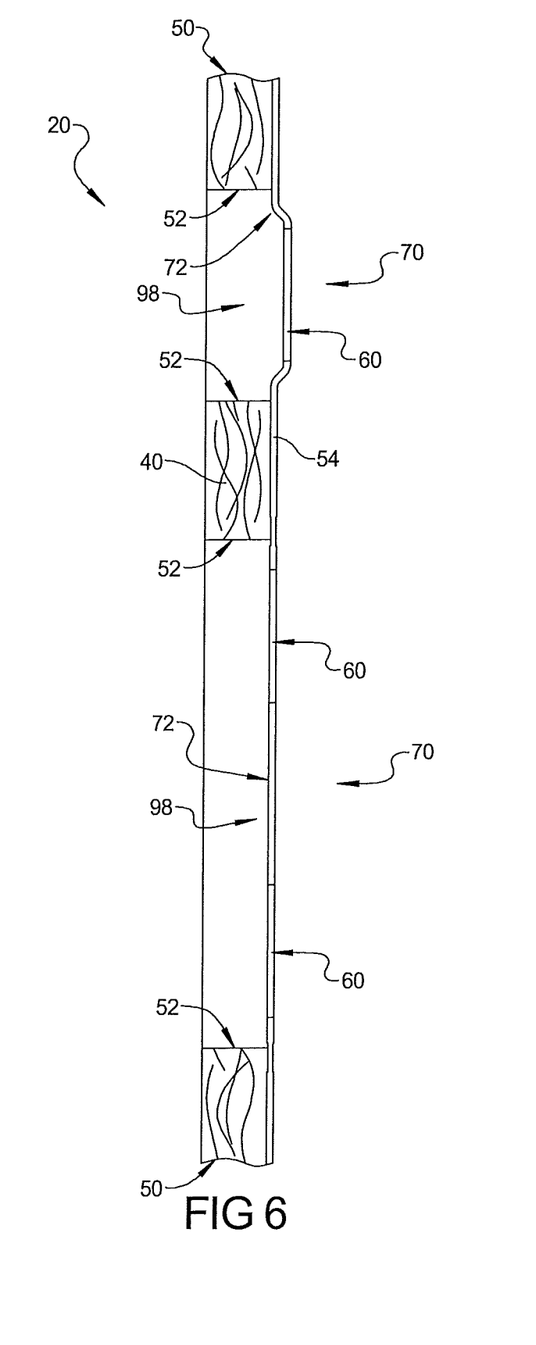
FIG. 6 is a side cross-sectional view of another exemplary acoustic barrier assembly constructed in accordance with the present disclosure that has multiple barrier apertures.
Figure 7:
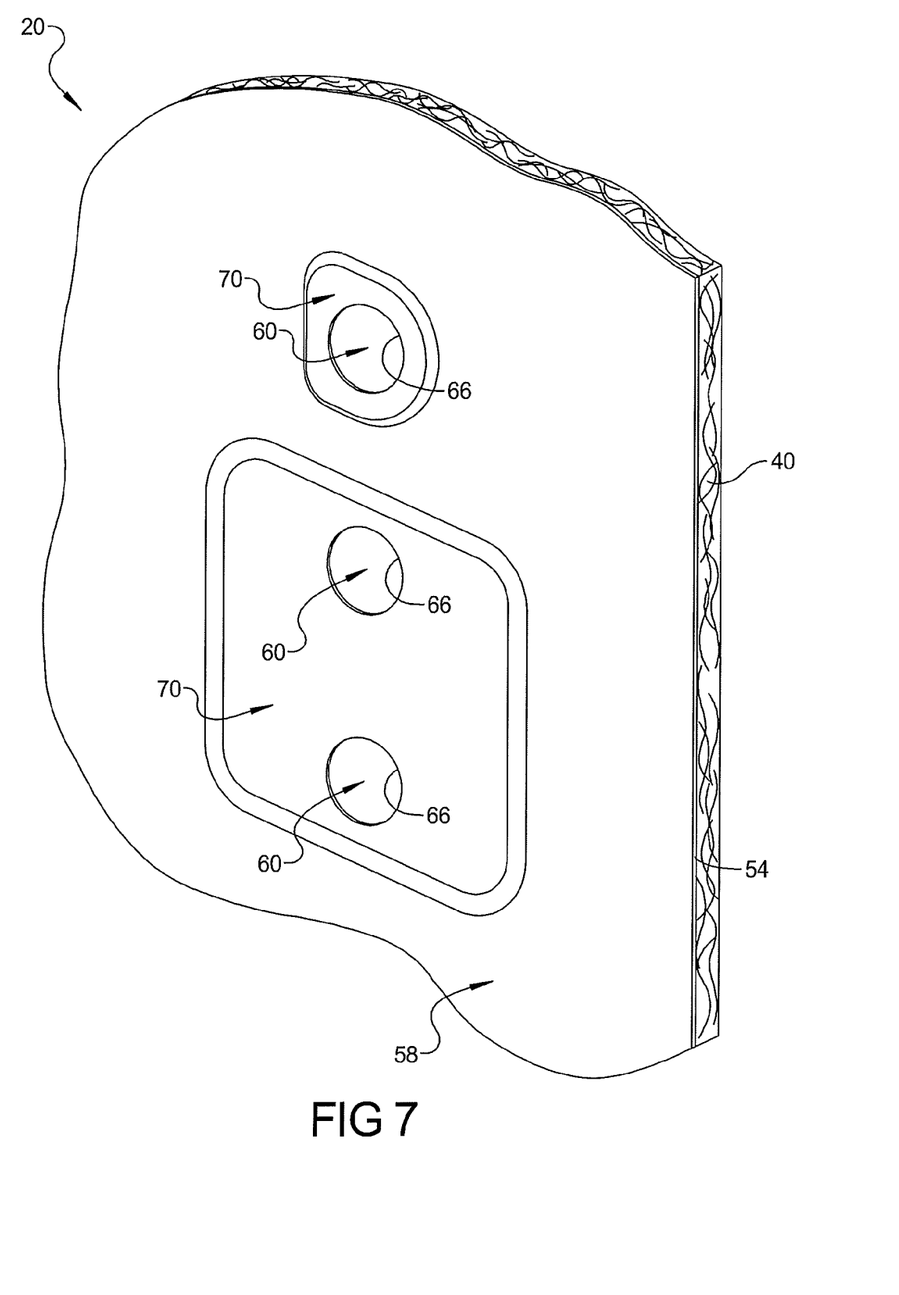
FIG. 7 is a front perspective view of the exemplary acoustic barrier assembly illustrated in FIG. 6.
Figure 8:
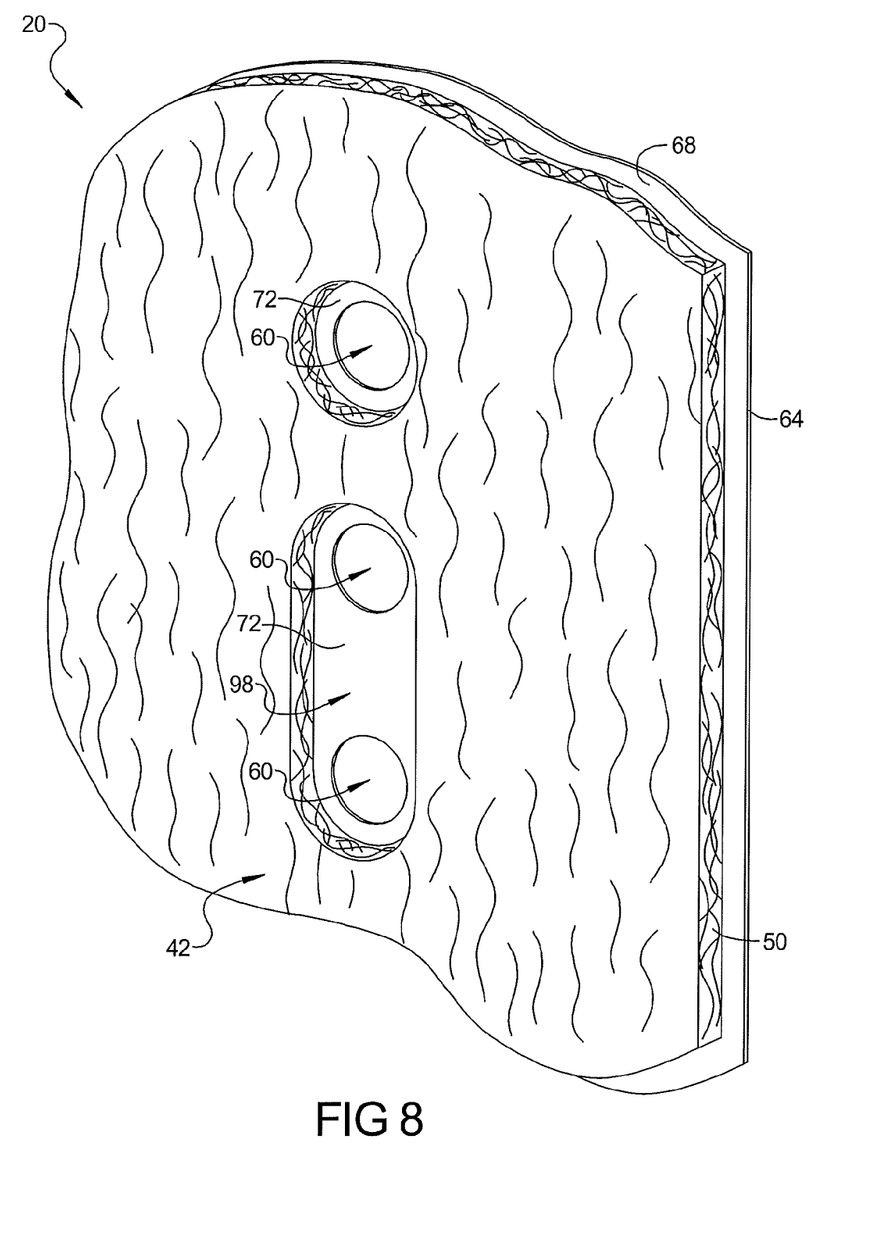
FIG. 8 is a rear perspective view of the exemplary acoustic barrier assembly illustrated in FIG. 6.

As shown in FIG. 5, a grommet 82 may optionally be disposed within the pass-through opening 24 in the wall 22 between the wall 22 and the penetrating member 30. The grommet 82 may thus function to help prevent the penetrating member 30 from directly contacting the wall 22 and/or may help prevent chafing of the penetrating member 30 against the opening perimeter 32 of the wall 22. Where a grommet 82 is utilized, the grommet 82 may abut the acoustic seal 70 such that the acoustic seal 70 extends to the grommet 82 and seals the grommet 82.

Still referring to FIG. 5, the acoustic barrier assembly 20 may also include an absorber layer 84 having a first absorber surface 86 that abuts the second barrier surface 58 and a second absorber surface 88 that is opposite the first absorber surface 86. Where the acoustic barrier assembly 20 is used in a vehicle, the second absorber surface 88 faces the passenger compartment 28 of the vehicle. The absorber layer 84 defines an absorber aperture 90 that is open to the pass-through opening 24 in the wall 22. The absorber layer 84 extends between the first absorber surface 86 and the second absorber surface 88 in the transverse direction to define an absorber thickness 92 and between an outer absorber perimeter 94 and an inner absorber perimeter 96 in the longitudinal direction. By way of example and without limitation, the absorber thickness 92 can range from approximately 5 millimeters (mm) to approximately 25 millimeters (mm), and can vary over the extent of the absorber layer 84 to accommodate compression due to local space restrictions, such as ventilation system ducting, electrical cableways, and the like. Notwithstanding, the absorber layer 84 need not be flat or of uniform thickness and the first absorber surface 86 may or may not be parallel to the second absorber surface 88. The absorber layer 84 may also have discontinuities such that the absorber layer 84 is applied to the barrier layer 54 only in areas where greater sound suppression and absorption are necessary.

The inner absorber perimeter 96 of the absorber layer 84 is formed about and is defined by the absorber aperture 90. The inner absorber perimeter 96 may be larger than both the inner barrier perimeter 66 and the inner decoupler perimeter 52. Meanwhile, the outer absorber perimeter 94 may be smaller than the outer barrier perimeter 64. Like the decoupler layer 40, the absorber layer 84 is made of a sound absorbent material. By way of example and without limitation, the absorber material may be made of microfibers, micro denier rider, polypropylene (PP), polyethylene terephthalate (PET), and/or a combination of these materials. The microfibers forming the absorber layer 84 may also be bounded by an acoustical scrim on one or both sides for strength and to protect the microfibers. Commercially available products that can be used for the absorber layer 84 include, without limitation, AutoZorb™ which is available from AIMs; SonoZorb™ which is available from GDC, Inc.; and Thinsulate™ which is available from the 3M Corporation.

The decoupler layer 40, the barrier layer 54, and the optional absorber layer 84 can all be joined to one another by heat and pressure, by bonding, by adhesive, by fastening, or by other suitable means. It should also be appreciated that while noise reduction is one of the functions of the disclosed acoustic barrier assembly 20, the acoustic barrier assembly 20 may also function as a thermal barrier. The decoupler layer 40, the barrier layer 54, and the optional absorber layer 84 create tortuous path layers, which limits air passage through the pass-through opening 24 and heat transfer through the wall 22.

Figure 9:
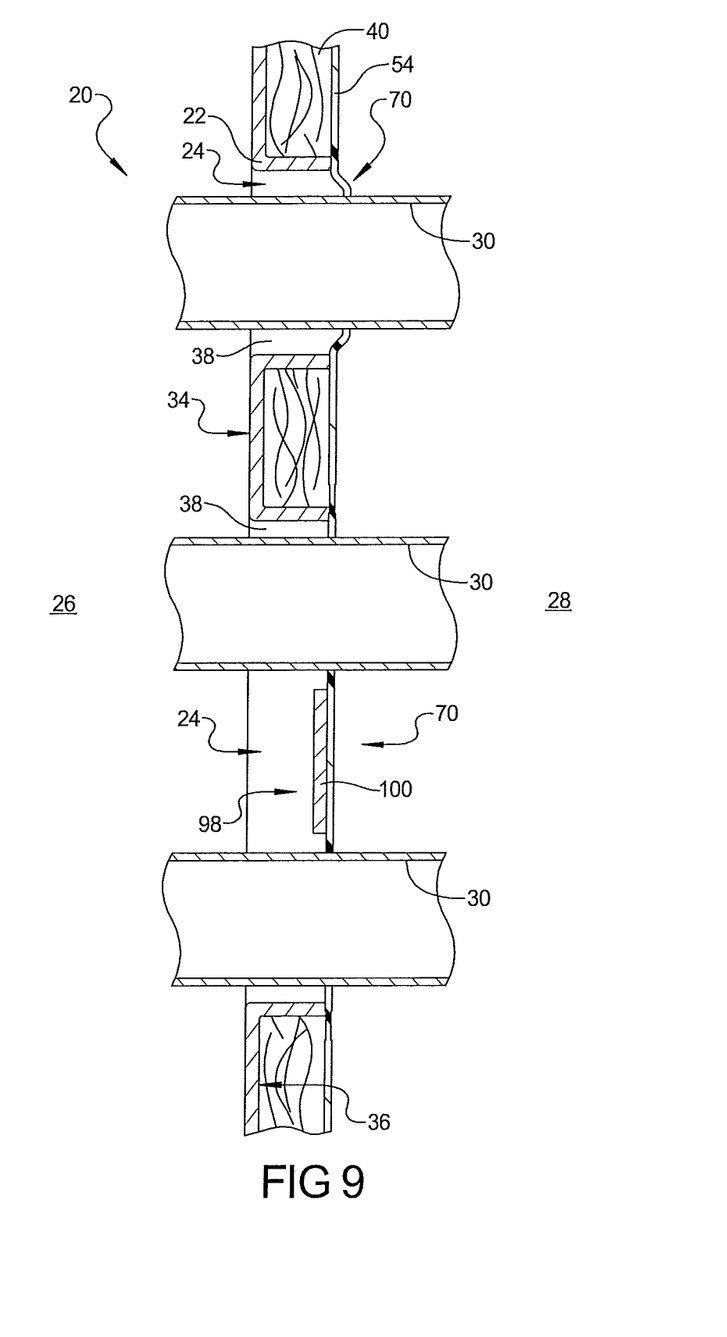
FIG. 9 is another side cross-sectional view of the exemplary acoustic barrier assembly illustrated in FIG. 6 where the exemplary acoustic barrier assembly is shown installed on a wall having multiple pass-through openings.
Figure 10:
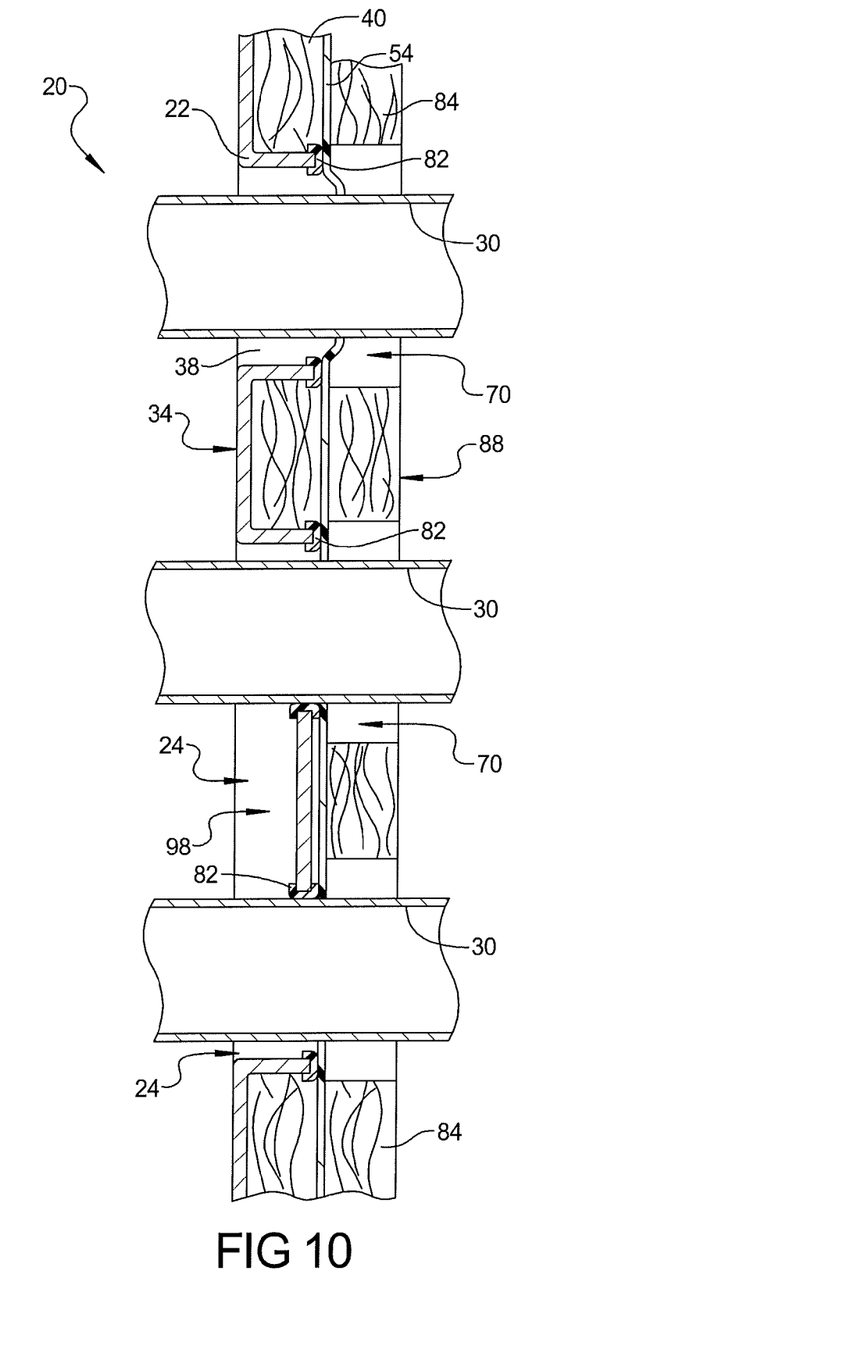
FIG. 10 is another side cross-sectional view of the exemplary acoustic barrier assembly illustrated in FIG. 6 where the exemplary acoustic barrier assembly is shown installed on a wall having multiple pass-through openings surrounded by grommets.

With reference now to FIGS. 6-9, the wall 22 may define additional pass-through openings 24 and the acoustic seal 70 may define additional barrier apertures 60 corresponding with each of the additional pass-through openings 24 in the wall 22. Multiple penetrating members 30 may thus extend through the additional pass-through openings 24 and the additional barrier apertures 60. Further, FIGS. 6-9 show that the exposed region 72 of the barrier layer 54 at the acoustic seal 70 may be generally planar and may not include a deep-drawn protrusion. Accordingly, a cavity 98 is created by the decoupler layer 40 adjacent the exposed region 72 of the barrier layer 54. This cavity 98 is thus circumscribed by the inner decoupler perimeter 52. As shown in FIGS. 9 and 10, the wall 22 may present a flange portion 100 that protrudes from the second wall surface 36. The cavity 98 formed in the decoupler layer 40 receives the flange portion 100 of the wall 22 such that the acoustic seal 70 seals against the flange portion 100 of the wall 22. Accordingly, one or more pass-through openings 24 in the wall 22 may be arranged to extend through the flange portion 100 of the wall 22. As shown in FIGS. 9 and 10, the acoustic barrier assembly 20 may or may not include the optional absorber layer 84 in this configuration. Further, the acoustic seal 70 of this configuration may be configured to accommodate a grommet 82 disposed in one or more of the pass-through openings 24 of the wall 22.

Figure 11:
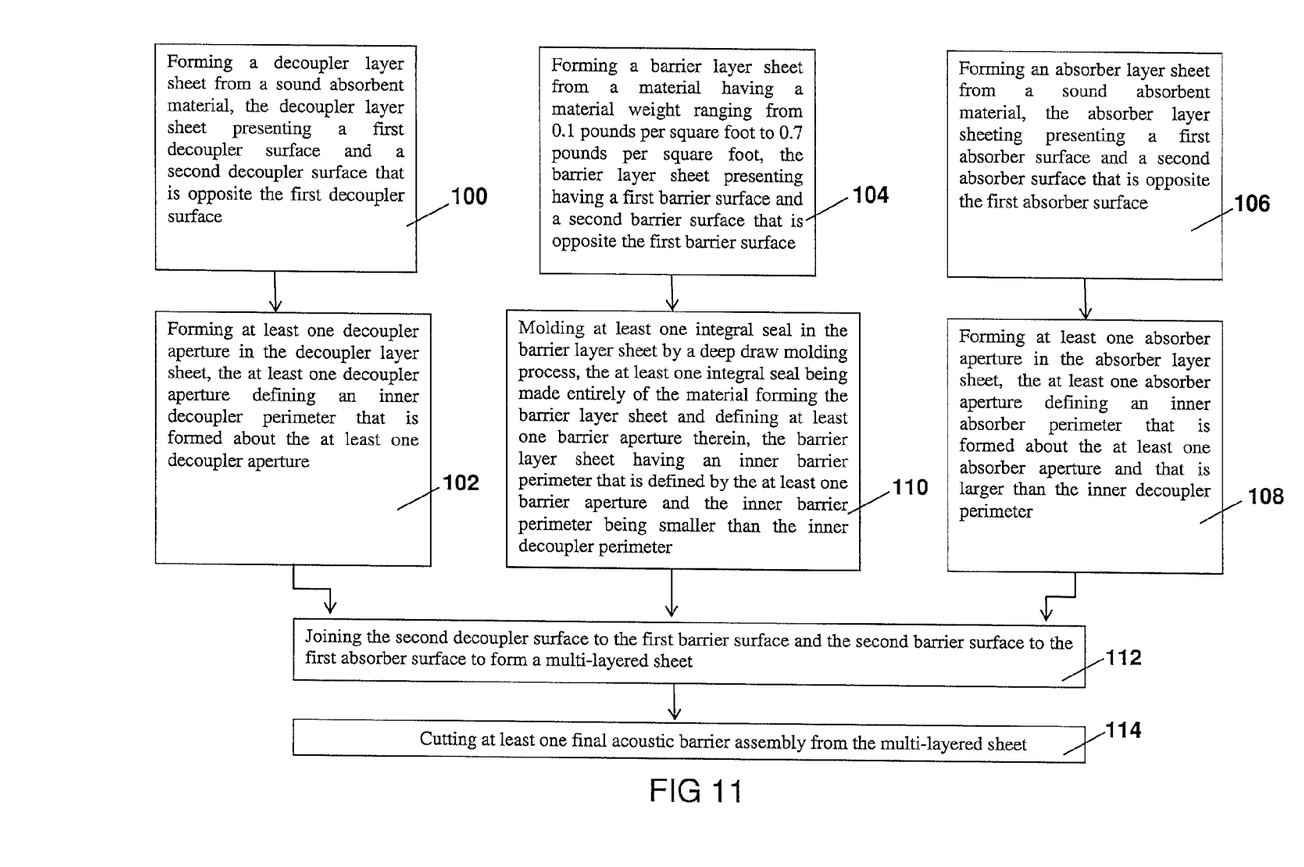
FIG. 11 is a schematic flow diagram illustrating an exemplary method of manufacturing an acoustic barrier assembly.

The subject disclosure also provides for a method of manufacturing an acoustic barrier assembly 20, such as the acoustic barrier assembly 20 described above. With reference to FIG. 11, the method includes Step 100 of forming a decoupler layer sheet 40 from a sound absorbent material. In accordance with Step 100, the decoupler layer sheet presents a first decoupler surface 42 and a second decoupler surface 44 that is opposite the first decoupler surface 42. The method also includes Step 102 of forming at least one decoupler aperture 46 in the decoupler layer sheet 40. In accordance with Step 102, the at least one decoupler aperture 46 defines an inner decoupler perimeter 52 that is formed about the at least one decoupler aperture 46. In Step 104, a barrier layer sheet 54 is formed from a material having a material weight ranging from approximately 0.050 pounds per square foot (psf) to approximately 0.7 pounds per square foot (psf). In accordance with Step 104, the barrier layer sheet presents a first barrier surface 56 and a second barrier surface 58 that is opposite the first barrier surface 56.

Step 106 includes forming an absorber layer sheet 84 from a sound absorbent material. In accordance with Step 106, the absorber layer sheet 84 presents a first absorber surface 86 and a second absorber surface 88 that is opposite the first absorber surface 86. Step 108 includes forming at least one absorber aperture 90 in the absorber layer sheet 84, where the at least one absorber aperture 90 defines an inner absorber perimeter 96 that extends about the at least one absorber aperture 90. In accordance with Step 108, the inner absorber perimeter 96 is larger than the inner decoupler perimeter 52. Since the absorber layer sheet 84 is optional, it should be appreciated that the method may proceed without Step 106 and Step 108 without departing from the scope of the present disclosure.

Step 110 includes molding at least one integral acoustic seal 70 in the barrier layer sheet 54 by a deep draw molding process during Step 104 of forming the barrier layer sheet 54. In other words, Step 110 may be performed contemporaneously with Step 104 or Step 110 may be performed sequentially with Step 104. In accordance with Step 110, the at least one integral acoustic seal 70 is made entirely of the material forming the barrier layer sheet 54 and the at least one integral acoustic seal 70 defines at least one barrier aperture 60 therein. Further, it should be appreciated that in accordance with Step 110, the at least one barrier aperture 60 is formed by a molding process rather than by a cutting process. After Steps 104 and 110 are performed, the barrier layer sheet 54 has an inner barrier perimeter 66 that is defined by the at least one barrier aperture 60 where the inner barrier perimeter 66 is smaller than the inner decoupler perimeter 52.

The method further includes Step 112 of joining the second decoupler surface 44 to the first barrier surface 56 after Step 110 of molding the at least one integral acoustic seal 70 in the barrier layer sheet 54. Step 112 may also optionally include joining the second barrier surface 58 to the first absorber surface 86. In accordance with Step 112, a multi-layered sheet is formed. The method may also include Step 114 of cutting at least one final acoustic barrier assembly 20 from the multi-layered sheet after Step 112 of joining the decoupler layer sheet 40 to the barrier layer sheet 54, and optionally, the barrier layer sheet 54 to absorber layer sheet 84.

Without departing from the scope of the method set forth in the present disclosure, the at least one decoupler aperture 46, the at least one absorber aperture 90, the at least one barrier aperture 60, and the at least one integral acoustic seal 70 created during Steps 102, 108, and 110 respectively, may include multiple decoupler apertures 46, multiple absorber apertures 90, multiple barrier apertures 60, and multiple acoustic seals 70. Further, the at least one final acoustic barrier assembly created during Step 114 may include multiple final acoustic barrier assemblies 20 each containing at least one of the multiple decoupler apertures 46, at least one of the multiple absorber apertures 90, at least one of multiple barrier apertures 60, and at least one of the multiple acoustic seals 70. As such, multiple final acoustic barrier assemblies 20 may be cut from a single multi-layered sheet to increase the output of the manufacturing process described herein such that multiple final acoustic barrier assemblies 20 can be made in a single manufacturing cycle.

It should be understood that the term "forming" as used herein mean to create and therefore includes a wide variety of manufacturing processes including, without limitation: extruding, weaving, pressing, cutting, rolling, bonding, and molding. The term "molding" as used herein encompasses a variety of molding processes including, without limitation: deep-drawing and injection molding. The term "joining" as used herein encompasses a variety of manufacturing processes including, without limitation: joining by heat and pressure (hot pressing), bonding by adhesive, bonding by fastening, vibration welding, heat welding, sonic welding, tufting, and use of push-pins. Finally, the term "cutting" as used herein encompasses a variety of manufacturing processes for separating or trimming material including, without limitation: mechanical shearing, laser cutting, water-jet cutting, die-cutting, and saw-cutting. It should also be appreciated that although Steps 100-114 of the method are described and illustrated herein in a particular order, these steps may be performed in a different order without departing from the scope of the present disclosure, except where the order of the steps is otherwise noted.

The foregoing description of the embodiments has been provided for the purposes of illustration and description. It is not intended to be exhaustive or limiting. Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the appended assembly claims refers to an antecedent that is a positive recitation meant to be included in the coverage of the appended assembly claims whereas the word "the" precedes a word not meant to be included in the coverage of the claims. For example, the term "vehicle" in the appended assembly claims is not a positive recitation meant to be included in the coverage of the appended assembly claims. The disclosed acoustic barrier assembly may find utility when installed in a vehicle; however, the presence or absence of the vehicle is not meant to be a condition required by the appended assembly claims. This convention only applies to the appended assembly claims and should be disregarded when interpreting the appended method claims.

What is claimed is:

1. An acoustic barrier assembly comprising:
    a wall defining a pass-through opening;
    a decoupler layer extending between an outer decoupler perimeter and an inner decoupler perimeter that defines a decoupler aperture, said decoupler layer having a first decoupler surface adjacent to said wall and a second decoupler surface opposite said first decoupler surface;
    a barrier layer abutting said second decoupler surface of said decoupler layer and extending between an outer barrier perimeter and an inner barrier perimeter that defines a barrier aperture that is open to said decoupler aperture; and
    an acoustic seal integrally formed in said barrier layer defining an exposed region of said barrier layer that is not bounded by said decoupler layer and that extends from said inner decoupler perimeter to said inner barrier perimeter, said exposed region of said acoustic seal being provided to seal around a penetrating member that extends through said decoupler aperture and said barrier aperture and block flanking noise from traveling through said acoustic barrier assembly adjacent the penetrating member,
    wherein said acoustic seal includes a deep-drawn projection that extends from said second decoupler surface, through said decoupler aperture in said decoupler layer, and through said pass-through opening in said wall such that a portion of said deep-drawn projection projects beyond said first decoupler surface of said decoupler layer.

2. An acoustic barrier assembly as set forth in claim 1 wherein said barrier layer is made of a first material and said acoustic seal is integrally molded as part of said barrier layer and is made entirely from said first material.

3. An acoustic barrier assembly as set forth in claim 1 wherein said deep-drawn projection of said acoustic seal defines an inner bore therein and includes an inner shoulder that extends inwardly from said inner bore to said inner barrier perimeter.

4. An acoustic barrier assembly as set forth in claim 2 wherein said first material forming said barrier layer has a material weight ranging from approximately 0.050 pounds per square foot to approximately 0.7 pounds per square foot.

5. An acoustic barrier assembly as set forth in claim 2 wherein said decoupler layer is made of a second material that is different than said first material forming said barrier layer.

6. An acoustic barrier assembly as set forth in claim 5 wherein said first material forming said barrier layer is a sound reflecting material and said second material forming said decoupler layer is a sound absorbent material.

7. An acoustic barrier assembly as set forth in claim 1 wherein said barrier layer and said decoupler layer are arranged in an overlapping relationship where said outer barrier perimeter that is greater than or equal to said outer decoupler perimeter.

8. An acoustic barrier assembly as set forth in claim 1 wherein said acoustic seal defines additional barrier apertures provided to receive additional penetrating members.

9. An acoustic barrier assembly for a vehicle comprising:
a wall defining a pass-through opening having an opening perimeter;
a penetrating member extending through said pass-through opening in said wall;
a decoupler layer surrounding said pass-through opening in said wall and defining a decoupler aperture that is open to said pass-through opening in said wall, said decoupler layer having an outer decoupler perimeter and an inner decoupler perimeter that is formed about said decoupler aperture and that surrounds said pass-through opening in said wall, said decoupler layer having a first decoupler surface adjacent to said wall and second decoupler surface opposite said first decoupler surface;
a barrier layer abutting said second decoupler surface of said decoupler layer and defining a barrier aperture that is open to said pass-through opening in said wall, said barrier layer having an outer barrier perimeter and an inner barrier perimeter that is formed about said barrier aperture; and
an acoustic seal integrally formed in said barrier layer that is made entirely of said material forming said barrier layer, said acoustic seal defining an exposed region of said barrier layer that is not bounded by said decoupler layer and that extends from said inner decoupler perimeter to said inner barrier perimeter, said exposed region of said barrier layer including a mating portion adjacent said inner barrier perimeter that extends along said wall and that directly contacts said wall around said pass-through opening to reduce flanking noise traveling through said acoustic barrier assembly adjacent the penetrating member,
wherein said acoustic seal includes a deep-drawn projection that extends from said second decoupler surface, through said decoupler aperture in said decoupler layer, and through said pass-through opening in said wall such that a portion of said deep-drawn projection projects beyond said first decoupler surface.

10. An acoustic barrier assembly as set forth in claim 9 wherein said barrier layer is made of a first material and said acoustic seal is integrally molded as part of said barrier layer and is made entirely from said first material.

11. An acoustic barrier assembly as set forth in claim 9 wherein said deep-drawn projection of said acoustic seal defines an inner bore therein and includes an inner shoulder that extends inwardly from said inner bore to said inner barrier perimeter.

12. An acoustic barrier assembly as set forth in claim 10 wherein said first material forming said barrier layer has a material weight ranging from approximately 0.050 pounds per square foot to approximately 0.7 pounds per square foot.

13. An acoustic barrier assembly as set forth in claim 10 wherein said decoupler layer is made of a second material that is different than said first material forming said barrier layer.

14. An acoustic barrier assembly as set forth in claim 9 wherein said barrier layer and said decoupler layer are arranged in an overlapping relationship where said outer barrier perimeter that is greater than or equal to said outer decoupler perimeter.

15. An acoustic barrier assembly as set forth in claim 9 wherein said wall defines additional pass-through openings and said acoustic seal defines additional barrier apertures corresponding with each of said additional pass-through openings in said wall that receive additional penetrating members.

16. An acoustic barrier assembly as set forth in claim 9 further comprising:
a grommet disposed within said pass-through opening in said wall between said wall and said penetrating member, wherein said acoustic seal abuts said grommet and seals against said grommet.

17. An assembly as set forth in claim 9 further comprising:
an absorber layer abutting said barrier layer opposite said decoupler layer such that at least portions of said barrier layer are sandwiched between said decoupler layer and said absorber layer, said absorber layer defining an absorber aperture that is open to said pass-through opening in said wall and being made of a sound absorbent material.

18. An acoustic barrier assembly as set forth in claim 9 further including said wall presenting a first wall surface facing an engine compartment of the vehicle and a second wall surface facing a passenger compartment of the vehicle that is opposite said first wall surface.

19. An acoustic barrier assembly as set forth in claim 18 wherein said decoupler layer has a decoupler thickness measured between said first decoupler surface and said second decoupler surface.

20. An acoustic barrier assembly as set forth in claim 19 wherein said barrier layer has a first barrier surface that abuts said second decoupler surface and a second barrier surface that is opposite said first barrier surface.

21. An acoustic barrier assembly as set forth in claim 20 further comprising:
an absorber layer having a first absorber surface that abuts said second barrier surface and a second absorber surface that is opposite said first absorber surface and that faces said passenger compartment of the vehicle, said absorber layer also having an outer absorber perimeter that is smaller than said outer barrier perimeter and an inner absorber perimeter that is larger than said inner decoupler perimeter and said inner barrier perimeter and that defines an absorber aperture.

* * * * *